US012711324B2

(12) United States Patent
Carter

(10) Patent No.: US 12,711,324 B2
(45) Date of Patent: Aug. 18, 2026

(54) GAME-PLAY-ASSISTED INDIVIDUAL AND/OR FAMILY HISTORY GENERATOR

(71) Applicant: Jeffrey L. Carter, Draper, UT (US)

(72) Inventor: Jeffrey L. Carter, Draper, UT (US)

( * ) Notice: Subject to any disclaimer, the term of this patent is extended or adjusted under 35 U.S.C. 154(b) by 195 days.

(21) Appl. No.: 18/798,027

(22) Filed: Aug. 8, 2024

(65) Prior Publication Data

US 2026/0044680 A1 Feb. 12, 2026

(51) Int. Cl.
*G06F 40/35* (2020.01)
*A63F 13/79* (2014.01)
*A63F 13/80* (2014.01)
*G06F 40/40* (2020.01)

(52) U.S. Cl.
CPC .............. *G06F 40/40* (2020.01); *A63F 13/80* (2014.09)

(58) Field of Classification Search
CPC .......... G06F 40/30; G06F 40/35; A63F 13/79; A63F 13/80
USPC ............................... 704/1, 9; 273/430; 463/9
See application file for complete search history.

(56) References Cited

U.S. PATENT DOCUMENTS 7,246,315 B1 * 7/2007 Andrieu ................. G06Q 90/00 715/753
7,810,037 B1 * 10/2010 Edwards ................ G06Q 10/10 715/752
7,818,396 B2 10/2010 Dolin et al.
8,341,139 B1 * 12/2012 Ogilvie ................. G06F 40/174 707/706
8,478,645 B2 * 7/2013 Russek .............. G06Q 30/0271 705/14.66
8,538,945 B1 * 9/2013 Ogilvie .................. G06Q 99/00 707/706
8,554,020 B2 * 10/2013 Berger .................. G06F 40/106 382/305
9,208,147 B1 * 12/2015 Nichols ................... G06F 40/56
9,213,947 B1 12/2015 Do et al.
9,390,225 B2 7/2016 Barber et al.
9,785,792 B2 10/2017 Barrett
10,846,622 B2 11/2020 Neumann
10,936,626 B1 3/2021 Naughton et al.
11,782,883 B1 * 10/2023 Fernandez .......... G06F 21/6227 726/27
11,817,176 B2 11/2023 Wilton et al.
2002/0019746 A1 2/2002 Rienhoff, Jr. et al.
2002/0128860 A1 9/2002 Leveque et al.
2004/0093334 A1 5/2004 Scherer
2008/0131887 A1 6/2008 Stephan et al.
2008/0238079 A1 * 10/2008 Whyte ................... B42D 5/042 281/3.1

(Continued)

*Primary Examiner* — Martin Lerner
(74) *Attorney, Agent, or Firm* — Nelson IP; Daniel P. Nelson

(57) ABSTRACT

A method for creating an individual and/or family history is disclosed. In one embodiment, such a method includes collecting, by way of game play provided by a computer application, memories of a user into a memory database. The method collects, by way of the computer application, a date for each of the memories. The computer application exports the memories in the memory database into an artificial intelligence engine capable of organizing the memories by date and transforming the memories into a written history of the user. The computer application retrieves the written history and provides the written history to the user. A corresponding system and computer program product are also disclosed herein.

20 Claims, 12 Drawing Sheets

(56) References Cited

U.S. PATENT DOCUMENTS

| | | | | |
|---|---|---|---|---|
| 2010/0070455 | A1 | 3/2010 | Halperin et al. | |
| 2011/0283172 | A1* | 11/2011 | Berger | G06Q 10/40 715/202 |
| 2013/0174026 | A1* | 7/2013 | Locke | G06F 40/166 715/254 |
| 2014/0067355 | A1 | 3/2014 | Noto et al. | |
| 2014/0237330 | A1* | 8/2014 | Pitzner | G06F 40/10 715/202 |
| 2015/0020170 | A1* | 1/2015 | Talley | H04L 63/08 726/4 |
| 2015/0100638 | A1* | 4/2015 | Cofield | G06Q 50/10 709/204 |
| 2017/0131855 | A1* | 5/2017 | Svendsen | G06F 40/166 |
| 2017/0329866 | A1 | 11/2017 | Macpherson | |
| 2017/0329899 | A1 | 11/2017 | Bryc et al. | |
| 2017/0329904 | A1 | 11/2017 | Naughton et al. | |
| 2019/0266223 | A1* | 8/2019 | Reinders | G06F 40/166 |
| 2020/0278991 | A1* | 9/2020 | Canter | G06F 40/35 |
| 2021/0375392 | A1 | 12/2021 | Polcari et al. | |
| 2022/0292216 | A1* | 9/2022 | Devitt | G06F 21/62 |
| 2024/0346342 | A1* | 10/2024 | Lewis | G06F 40/30 |

* cited by examiner

800

GAME-PLAY-ASSISTED INDIVIDUAL AND/OR FAMILY HISTORY GENERATOR

THE FIELD OF THE INVENTION

This invention relates to systems and methods for generating personal and/or family histories.

BACKGROUND OF THE INVENTION

Writing an individual or family history is often a complex and time-consuming endeavor due to the depth and breadth of research required. One must often delve into various sources such as archives, public records, personal letters, photographs, and oral histories, with each potentially being scattered across different locations and institutions. Sifting through these materials to find relevant information can be an exhaustive and labor-intensive process.

Additionally, the process of organizing and narrating any gathered information into a coherent and engaging story poses its own set of challenges. This may involve not only chronicling events in a logical sequence but also contextualizing them within broader historical, social, and cultural frameworks. Crafting a compelling narrative that captures the essence of the individual's or family's experiences may require a delicate balance of factual accuracy and storytelling finesse. All of these factors may contribute to the labor-intensive nature of producing a meaningful and comprehensive individual or family history.

SUMMARY OF THE INVENTION

The invention has been developed in response to the present state of the art and, in particular, in response to the problems and needs in the art that have not yet been fully solved by currently available apparatus and methods. Accordingly, apparatus and methods in accordance with the invention have been developed to create an individual and/or family history. The features and advantages of the invention will become more fully apparent from the following description and appended claims, or may be learned by practice of the invention as set forth hereinafter.

Consistent with the foregoing, a method for creating an individual and/or family history is disclosed. In one embodiment, such a method includes collecting, by way of game play provided by a computer application, memories of a user into a memory database. The method collects, by way of the computer application, a date for each of the memories. The computer application exports the memories in the memory database into an artificial intelligence engine capable of organizing the memories by date and transforming the memories into a written history of the user. The computer application retrieves the written history and provides the written history to the user.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION OF THE INVENTION

Figure 1:
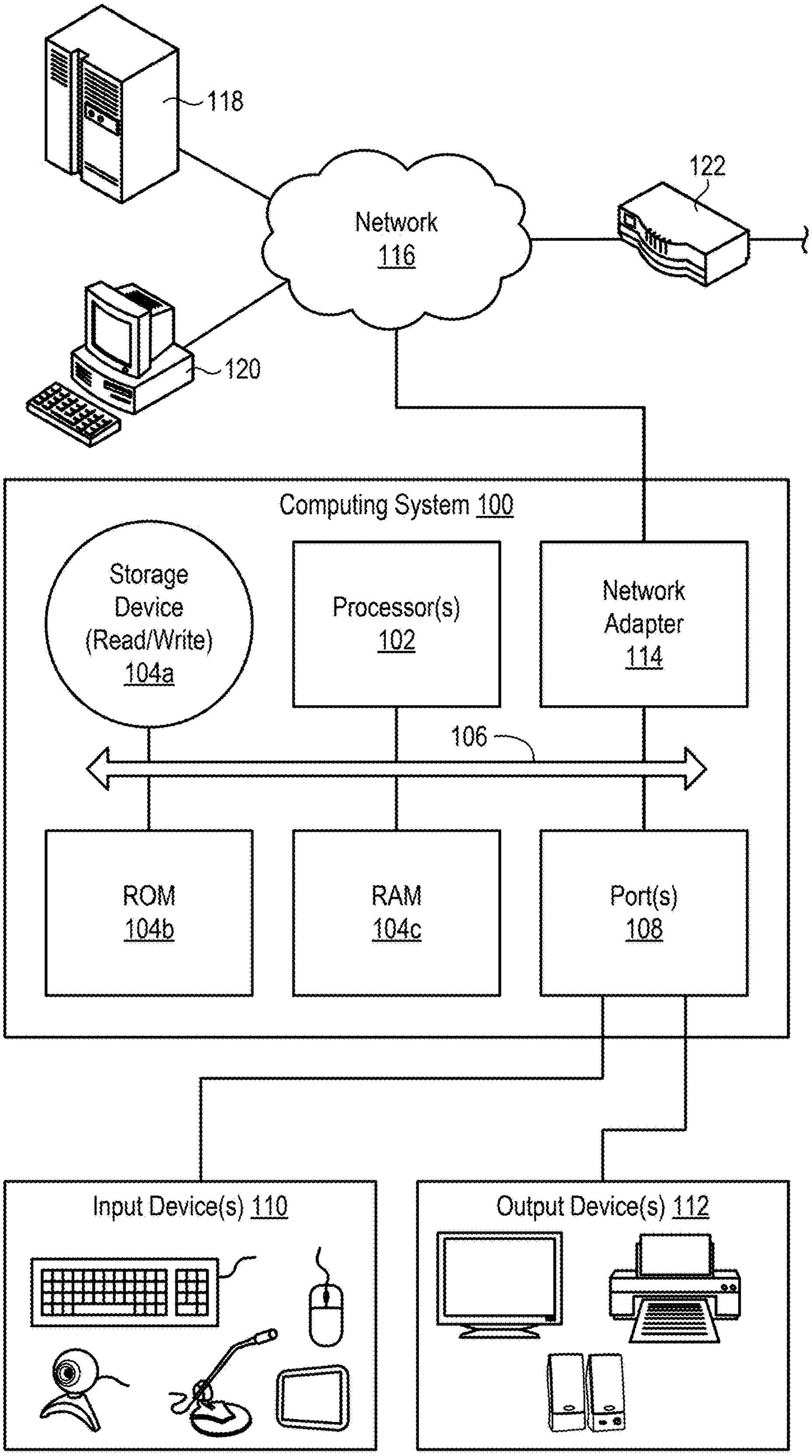
FIG. 1 is a high-level block diagram showing one example of a computing system for use in implementing embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a computing system 100 is illustrated. The computing system 100 is presented to show one example of an environment where a history generator module 200 in accordance with the invention may be implemented. The computing system 100 may be embodied as a desktop computer, a workstation, a laptop computer, a server, a storage controller, a mobile device 100 such as a smart phone or tablet, or the like. The computing system 100 is presented by way of example and is not intended to be limiting. Indeed, the systems and methods disclosed herein may be applicable to a wide variety of different computing systems in addition to the computing system 100 shown. The systems and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104*a*, solid state drives 104*a*, CD-ROM drives 104*a*, DVD-ROM drives 104*a*, tape drives 104*a*, or the like. The memory 104 may also include non-volatile memory such as a read-only memory 104*b* (e.g., ROM, EPROM, EEPROM, and/or Flash ROM) or volatile memory such as a random access memory 104*c* (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a wired or wireless network adapter 114 to connect the computing system 100 to a network 116, such as a local area network (LAN), wide area network (WAN), storage area network (SAN), or the Internet. Such a network 116 may enable the computing system 100 to connect to or communicate with one or more servers 118, workstations 120, personal computers 120, mobile computing devices, or other devices. The network 116 may also enable the computing system 100 to connect to or communicate with another network by way of a router 122 or other device 122. Such a router 122 may allow the computing system 100 to communicate with servers, workstations, personal computers, or other devices located on different networks.

As previously mentioned, writing an individual or family history, although a worthwhile endeavor with many benefits, is often a complex and time-consuming endeavor due to the depth and breadth of research required. One must often delve into various sources such as archives, public records, personal letters, photographs, and oral histories, with each potentially being scattered across different locations and institutions. Sifting through these materials to find relevant information can be an exhaustive and labor-intensive process.

Additionally, the process of organizing and narrating any gathered information into a coherent and engaging story poses its own set of challenges. This may involve not only chronicling events in a logical sequence but also contextualizing them within broader historical, social, and cultural frameworks. Crafting a compelling narrative that captures the essence of the individual's or family's experiences may require a delicate balance of factual accuracy and storytelling finesse. All of these factors may contribute to the labor-intensive nature of producing a meaningful and comprehensive individual or family history. Thus, it would be an advance in the art to provide systems and methods for more easily creating individual and/or family histories. One such system and method (referred to hereinafter as a history generator module 200) is disclosed in the following description and figures.

Figure 2:
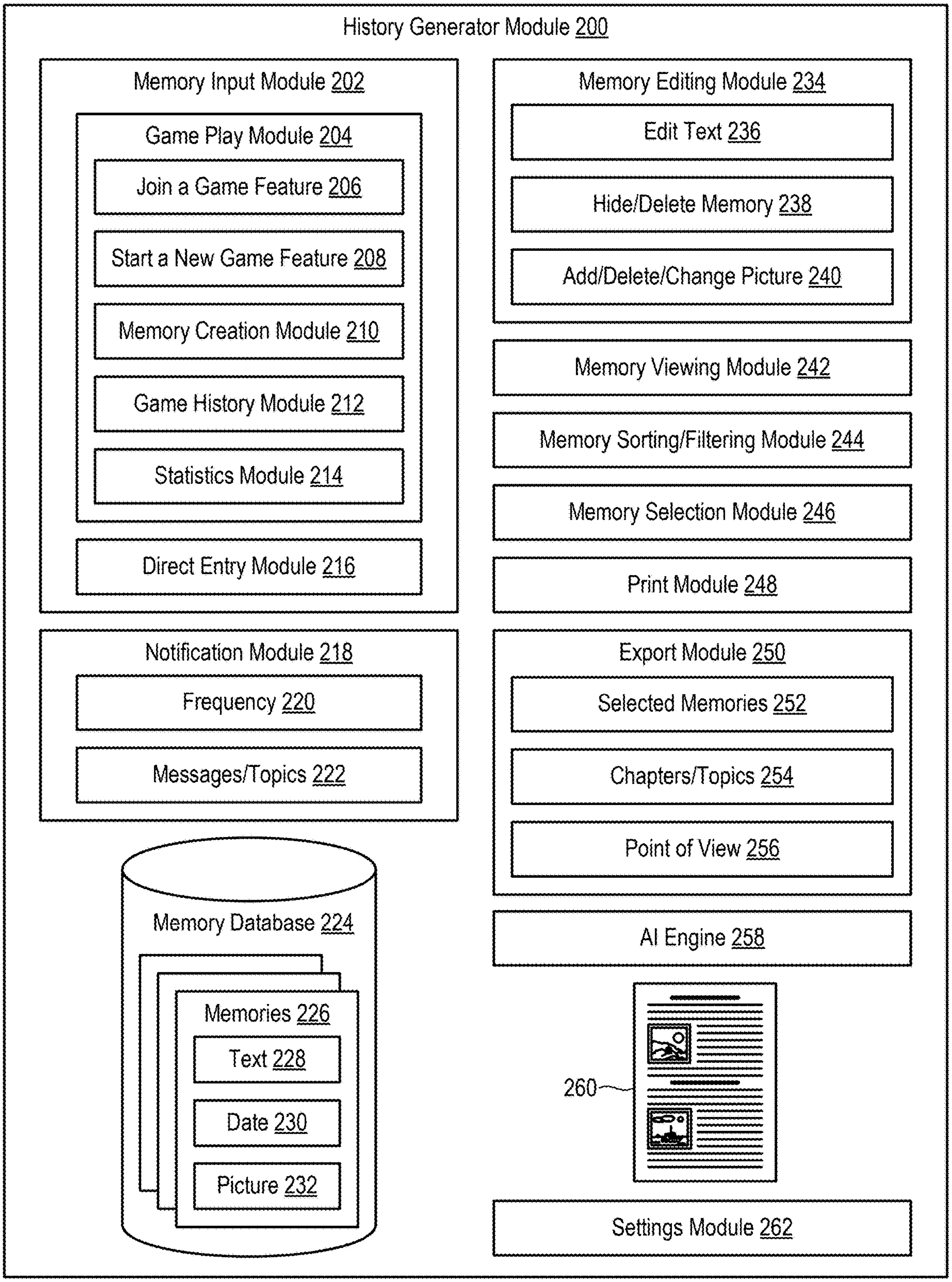
FIG. 2 is a high-level block diagram showing a history generator module and various associated sub-modules for creating an individual and/or family history.

Referring to FIG. 2, a high-level block diagram showing a history generator module 200 and associated sub-modules is illustrated. The history generator module 200 and associated sub-modules may be implemented in hardware, software, firmware, or combinations thereof. The history generator module 200 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the history generator module 200 may include one or more of a memory input module 202, notification module 218, memory editing module 234, memory viewing module 242, memory sorting module 244, memory selection module 246, print module 248, export module 250, artificial intelligence engine 258, and a settings module 262. The memory input module 202 may include both a game play module 204 and a direct entry module 216.

As shown, a memory input module 202 may be configured to input a user's memories 226 into the history generator module 200. These memories 226 may include a user's recollections of specific events or episodes in the user's life, such as travels, birthday parties, significant personal achievements, births or deaths of loved ones, holidays, special occasions, religious events, and the like. They may include details about the time, place, and emotions associated with the event. The memory input module 202 may gather these memories 226 from the user using a game play module 204, direct entry module 216, and/or the like.

Because gathering memories 226 for the purpose of creating an individual or family history can be a tedious process, the game play module 204 may in certain embodiments make this process less tedious by gathering these memories 226 in the course of playing game. For example, the game "two truths and a lie" is a popular game or icebreaker that helps people get to know each other better. The game typically involves each participant producing three statements about him or herself, two of which are true and one of which is false. The objective for the other players is to guess which statement is false. When implemented on a computing device hosting the history generator module 200, the game may be used advantageously to gather memories 226 for use in an individual or family history. The longer and/or more times the game is played, the more memories 226 that may be collected by the memory input module 202. Thus, the game play module 204 may be advantageously used to collect memories 226 from users in the course of playing a game.

As shown, in certain embodiments, the game play module 204 may include features such as a "join a game" feature 206 that enables a user a to join an already existing game on his or her computing device, such as by entering a code for the game into his or her computing device. The game play module 204 may also enable the user to start a new game 208 which may produce a code for providing to other users. While the game is being played, the memory creation module 210 may create memories 226 (e.g., the two truths) for recording in a memory database 224. A game history module 212 may enable the user to view a history of the game (e.g., games, dates, winners, memories entered within the games) on his or her computing device, and the statistics module 214 may report statistics about the game, such as how many memories 226 have been collected, the number of points earned by the user in the course of playing the game, the rank of the user compared to other users with respect to the number of memories the user has entered into the memory database 224.

Similarly, in certain embodiments, the memory input module 202 may include a direct entry module 216 to enable a user to directly enter memories 226 into the memory database 224 outside of the game. For example, the user may enter memories 226 in the form of text 228, dates 230, and potentially pictures 232 associated with the memories 226 into the memory database 224. This may allow the user to fill in any gaps in the memories 226 that are collected by the game play module 204 as well as enter memories 226 that might otherwise not be entered in the course of playing a game.

In certain embodiments in accordance with the invention, a notification module 218 may be configured to periodically remind a user to enter memories 226 into the memory database 224. This may be accomplished by sending a periodic (e.g., daily, bi-weekly, weekly, bi-monthly, monthly, etc.) message 222 (e.g., text message, email, push notification, etc.) to remind a user to enter a memory in accordance with a pre-established or user-configurable frequency 220. In certain embodiments, a specific topic may be suggested to assist the user in recollecting important memories 226 and to uncover potentially long-lost memories. For example, in one embodiment, notifications may be sent to a user every four days as follows:

Saturday: Enter a memory (or two) from this past week.

Wednesday: Enter a memory or two about one of your proudest moments.

Sunday: Memories are the dividends of life. Enter a few now.

Thursday: Enter a memory or two about one of your proudest moments.

Monday: Enter a memory or two from last weekend.

Friday: It's Fun Fact Friday! Enter one about you in the form of a memory.

Tuesday: Enter a memory you have with a sibling.

Saturday: Enter a memory or two about a vacation.

Wednesday: Enter a memory or two from jobs you have had.

Sunday: Memories are the dividends of life. Enter a few now.

Thursday: Enter one or two of your most embarrassing moments.

Monday: Find a picture on your phone and add a memory of it then add the picture to the memory by clicking on the memory.

Friday: It's Fun Fact Friday! Enter one about you in the form of a memory.

Tuesday: Enter a memory from a holiday.

Saturday: Enter a memory or two from a favorite trip.

Wednesday: Enter a memory or two with your parents.

Sunday: Memories are life dividends. Enter a few now.

Thursday: Enter a memory or two with one of your best friends.

Monday: Enter a memory or two from last weekend.

Friday: It's Fun Fact Friday! Enter one about you in the form of a memory.

Tuesday: Enter a memory or two from your days in school (any grade).

Once memories 226 are added to the memory database 224, the memory editing module 234 may enable the memories 226 to be edited. For example, the memory editing module 234 may enable text of the memories 226 to be edited 236, memories 226 to be hidden 238 or deleted 238, or a picture or date to be added 240, changed 240, or deleted for particular memories 226.

By contrast, the memory viewing module 242 may enable the memories 226 in the memory database 224 to be viewed by the user. This may include presenting them in a list in a graphical user interface as will be explained in more detail hereafter. This list may be scrolled through and/or paged through to view memories 226 in the list. In certain embodiments, a memory sorting/filtering module 244 may enable sorting of the memories 226 in the list, such as in the order of their date or those having pictures, or filtering out certain memories 226, such as those having a certain date or range of dates or those not having pictures attached. These represent just a few examples and are not intended to be limiting.

A memory selection module 246 may enable a user to select particular memories 226 from the memory database 224. For example, a check box may be provided adjacent to each memory 226 to enable the user to select the corresponding memory 226. Particular operations may then be performed for the selected memories 226. For example, a print module 248 may enable printing of the selecting memories, such as creating a pdf document that is suitable for printing and that contains the selected memories 226.

In other embodiments, an export module 250 may enable selected memories 252 to be exported for further processing. For example, in certain embodiments, the export module 250 may export the selected memories 252 as well as potentially chapters/topics 254 and a desired point of view (e.g., first person, third person, etc.) to an artificial intelligence engine 258. The artificial intelligence engine 258 may then transform the selected memories 252 into an individual or family written history, potentially with the designated chapters/topics 254 and from the designated point of view 256. The artificial intelligence engine 258 may accomplish this, in certain embodiments, by understanding the selected memories 252 and chapters/topics 254, organizing the selected memories 252 under the most suitable chapters/topics 254, creating an outline of the selected memories 252 under their corresponding chapters/topics 254, and writing a narrative 260 or story 260 describing the history of the individual or family from the designated point of view 256. In this way, the history generator module 200 may create an individual or family history. This individual or family history may, in certain embodiments, be provided in an editable format to enable a user to modify, fill in gaps, or correct the individual or family history.

The artificial intelligence engine 258 may include, for example, a large language model (LLM) that is trained on large datasets and can generate coherent and contextually appropriate text based on input prompts; a story generation model that is a specifically fine-tuned version of a language model designed to create narratives or stories from given inputs; an artificial intelligence writing assistant that is built on top of a language model to assist in writing by generating text based on user input; or the like.

Figure 11:
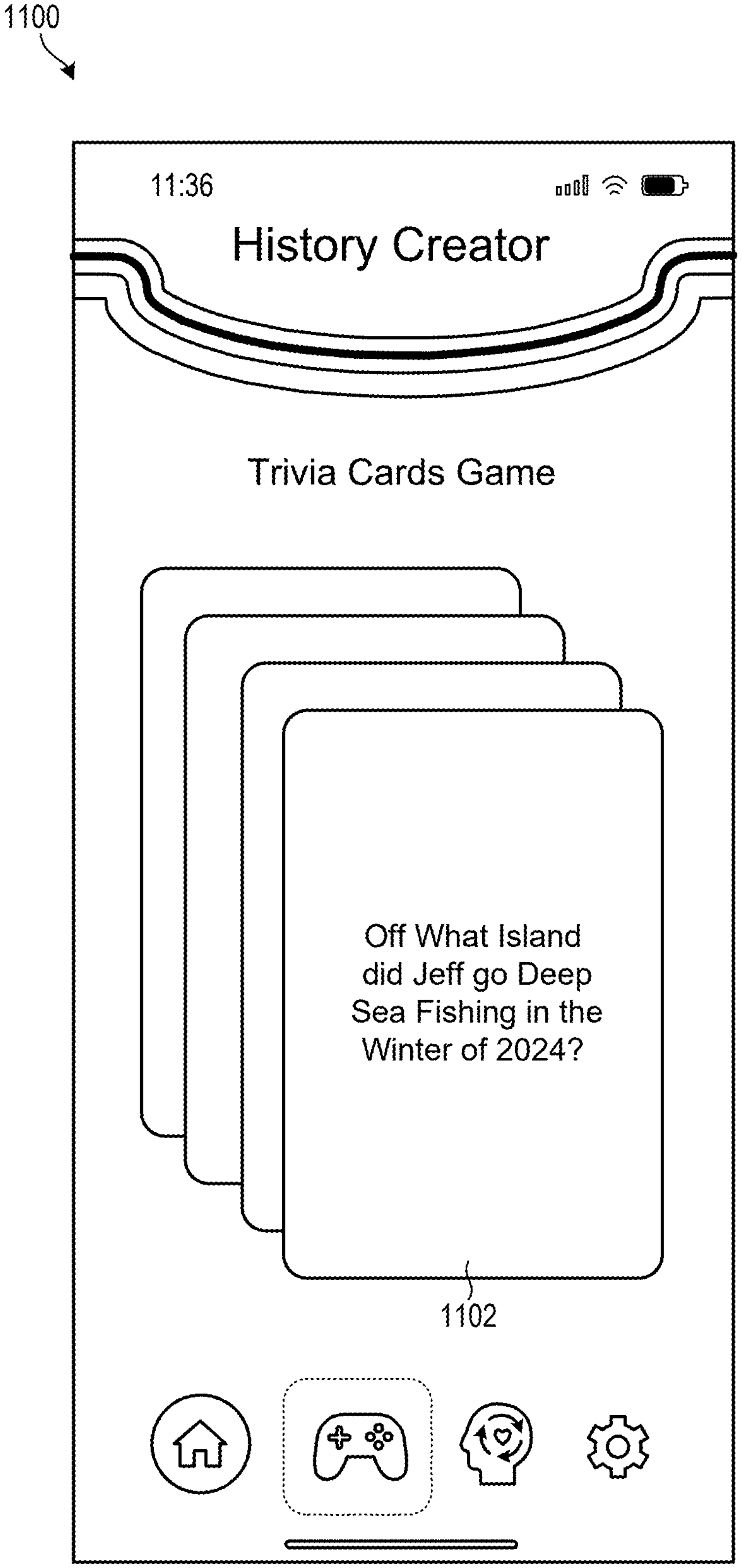
FIG. 11 shows one embodiment of a trivia game that may be generated from memories gathered by the history generator module.

Alternatively, or additionally, the artificial intelligence engine 258 may create, from the selected memories 252, a trivia game that presents unique and/or challenging questions about a user's life based on the user's selected memories 252. In certain embodiments, these questions may be printed on physical cards as part of a physical game. Alternatively, the trivia game may be presented virtually such as on virtual trivia cards provided in an application for execution on a computing system. For example, FIG. 11 shows one embodiment of virtual trivia cards that may be presented as part of an app-based trivia game.

The settings module 262 may be used to establish or modify various settings or invoke various functions of the history generator module 200. For example, the settings module 262 may enable a user to retrieve his or her memories 226 from the memory database 224 in order to print or create a pdf that documents the memories 226 in the memory database 224. The settings module 262 may also enable a user to share the application (i.e., the history generator module 200) with others such as friends and family to facilitate downloading and installing the history generator module 200 on their respective computing systems. The settings module 262 may also enable a user to augment features of the history generator module 200 by paying a fee to purchase the application, and/or enable a user to visit a website associated with the history generator module 200 to learn more about the history generator module 200.

The settings module 262 may also enable a user to restore a purchase in order to recover previously purchased content or services without having to pay again. This may be useful if a user has deleted the application but later reinstalls it and wants to regain access to content or features that the user previously paid for; the user switches to a new device and wants to restore a purchase on the new device; or the user logs into the application on multiple devices and wants the application to be available across all devices.

The settings module 262 may also set forth terms and conditions for using the history generator module 200, and provide a privacy policy in association with the user memories 226. The settings module 262 may also, in certain embodiments, enable a user to clear the history of the history generator module 200, such as clear any memories 226 from the memory database 224, and delete a user account from the history generator module 200. These represent just a few potential features of the settings module 262 and are not intended to be limiting.

Figure 3:
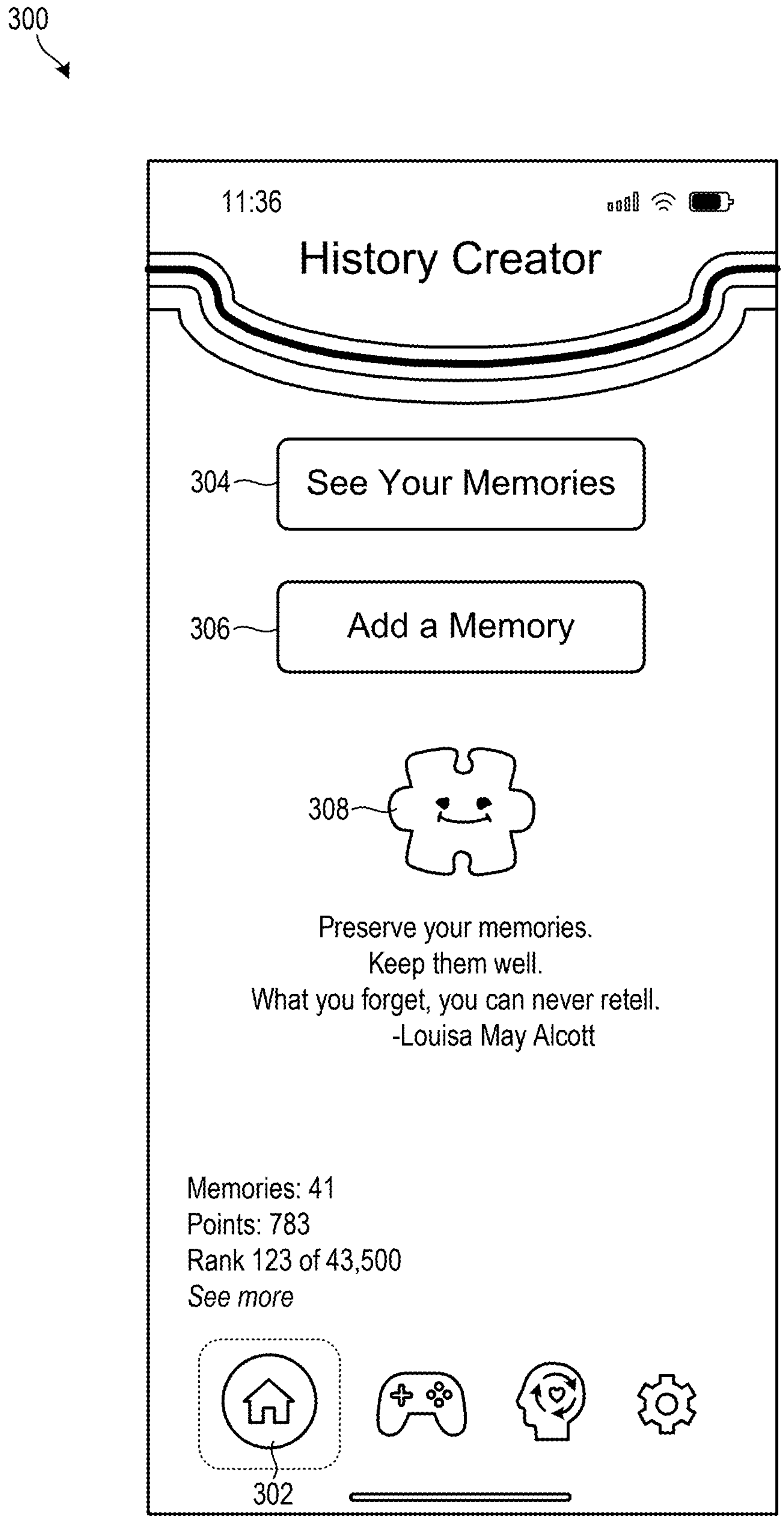
FIG. 3 shows one embodiment of a home page of a graphical user interface for implementing the history generator module.

FIG. 3 shows one embodiment of a home page 300 of a graphical user interface of the history generator module 200. In certain embodiments, the home page 300 may be displayed by selecting a home button 302 on the graphical user interface. As shown, in this embodiment, the home page 300 includes a button 304 for a user to view his or her memories 226 that are stored in the memory database 224, and an option 306 to add a memory 226 to the memory database 224 by way of direct entry. A unique avatar 308 may also be provided for the user. In this embodiment, the home page 300 also lists an inspirational phrase and various statistics of the history generator module 200, including the number of memories 226 that are stored in the memory database 224, the number of points that have been scored by the user when playing a game (e.g., two truths and a lie game) of the history generator module 200, and a rank of the user compared to other users in entering memories 226 into the memory database 224.

Figure 4:
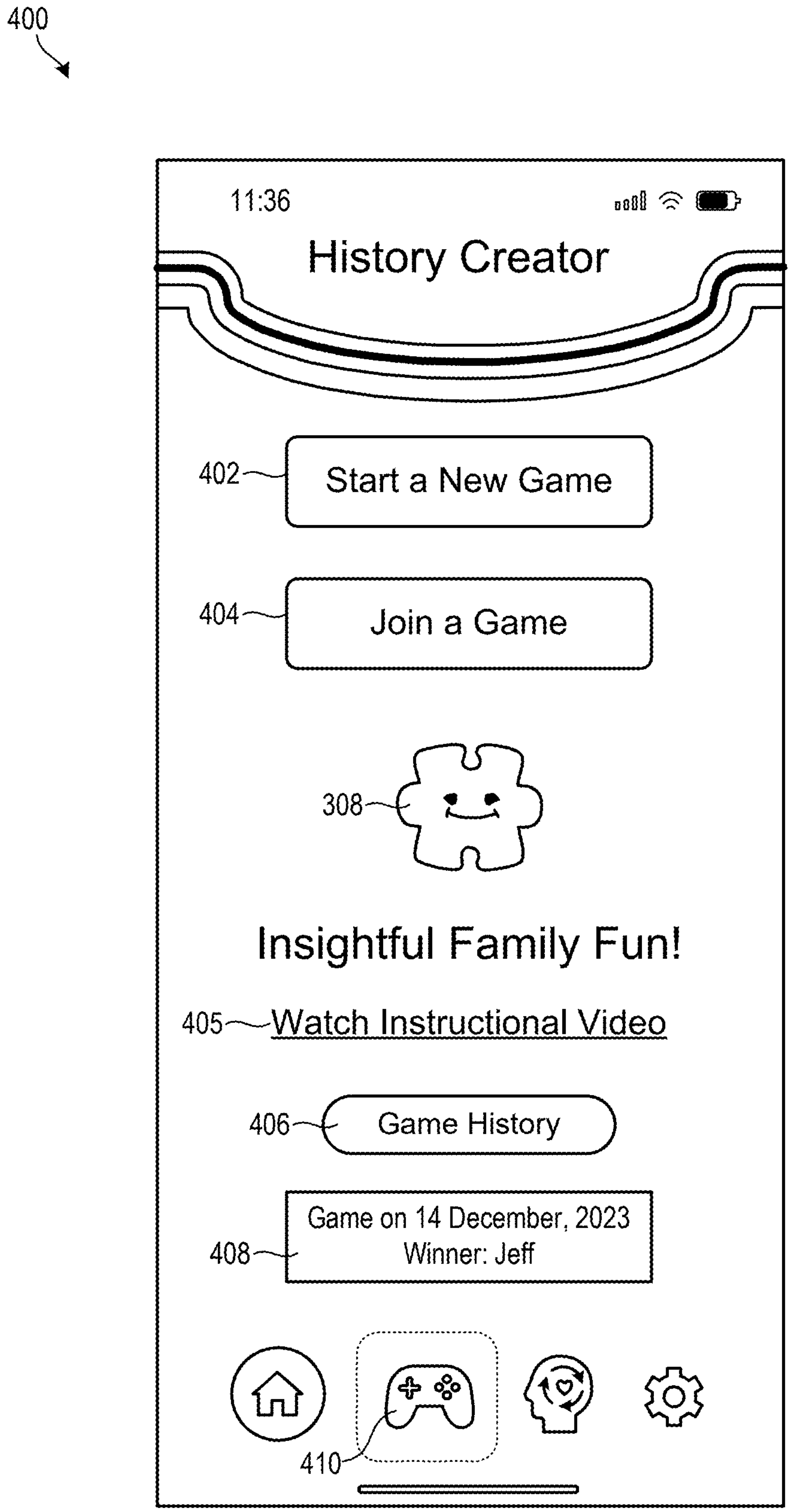
FIG. 4 shows one embodiment of a game-play page of the graphical user interface for implementing the history generator module.

FIG. 4 shows one embodiment of a game-play page 400 of a graphical user interface for implementing the history generator module 200. In certain embodiments, the game-play page 400 may be displayed by selecting a gaming button 410 on the graphical user interface. As shown, in this embodiment, the game-play page 400 includes a button 402 for starting a new game, and a button 404 for joining an already existing game. In certain embodiments, starting a game will provide the user with a code that he or she can then provide to other users to allow them to join the game. In this embodiment, the game-play page 400 also includes a link to watch an instructional video detailing how to play the game. The game-play page 400 may also, in certain embodiments, include a game history 406, 408, including, for example, listing when previous games were played and who won the games.

Figure 5:
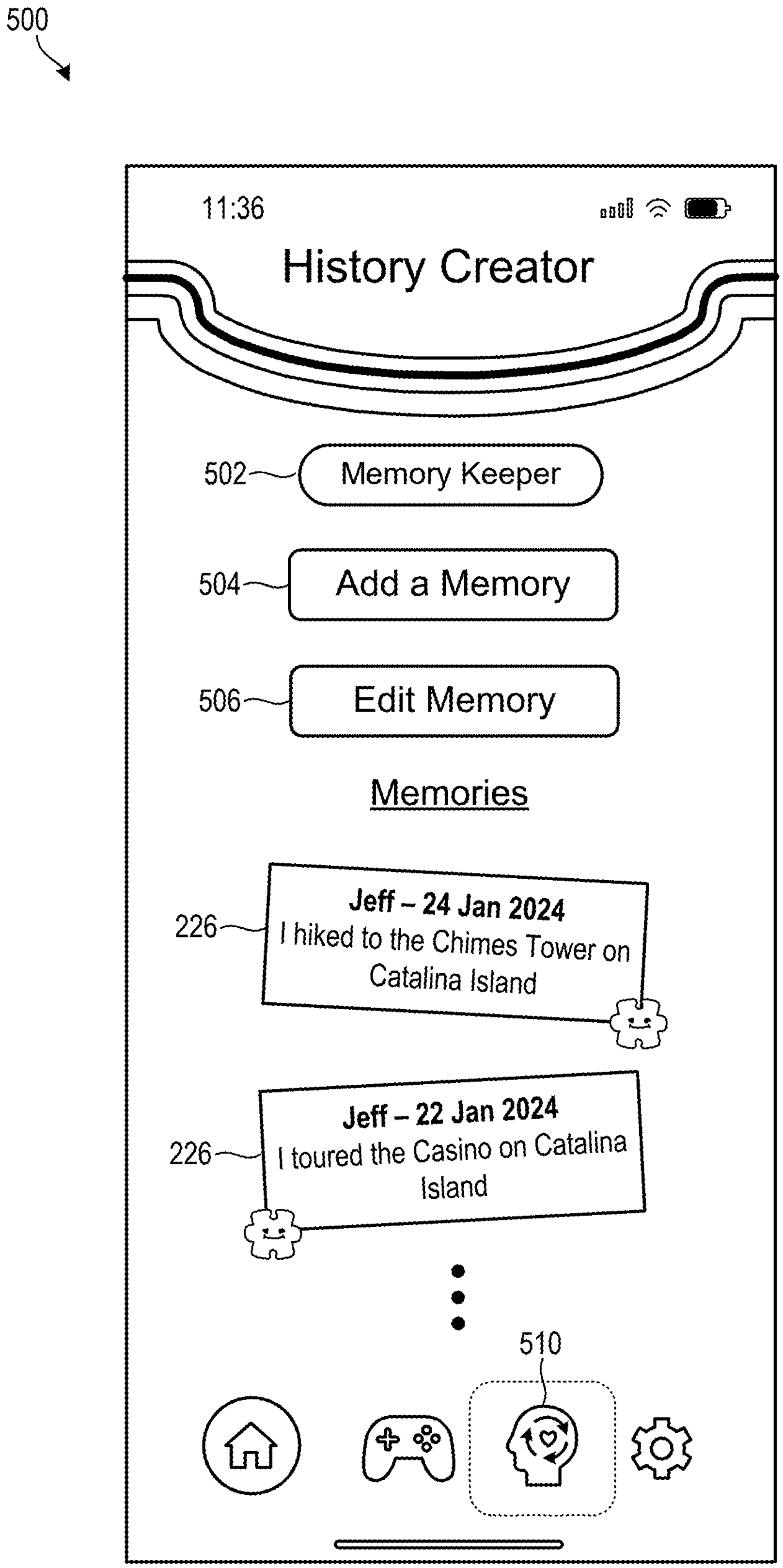
FIG. 5 shows one embodiment of a memory keeper page of the graphical user interface for implementing the history generator module.

FIG. 5 shows one embodiment of a memory-keeper page 500 of a graphical user interface of the history generator module 200. In certain embodiments, the memory-keeper page 500 may be displayed by selecting a memory button 510 on the graphical user interface. As shown, in this embodiment, the memory-keeper page 500 includes a label 502 indicating the purpose of the page 500, a button 504 for adding a memory 226 to the memory database 224 (i.e., by direct entry as opposed to through game play), and a button 506 for editing a memory 226 already in the memory database 224. In this particular embodiment, the memory-keeper page 500 shows a list of memories 226 that are stored in the memory keeper (i.e., the memory database 224). In certain embodiments, a user may scroll through this list to view memories 226 that are on or off the page 500.

Figure 6:
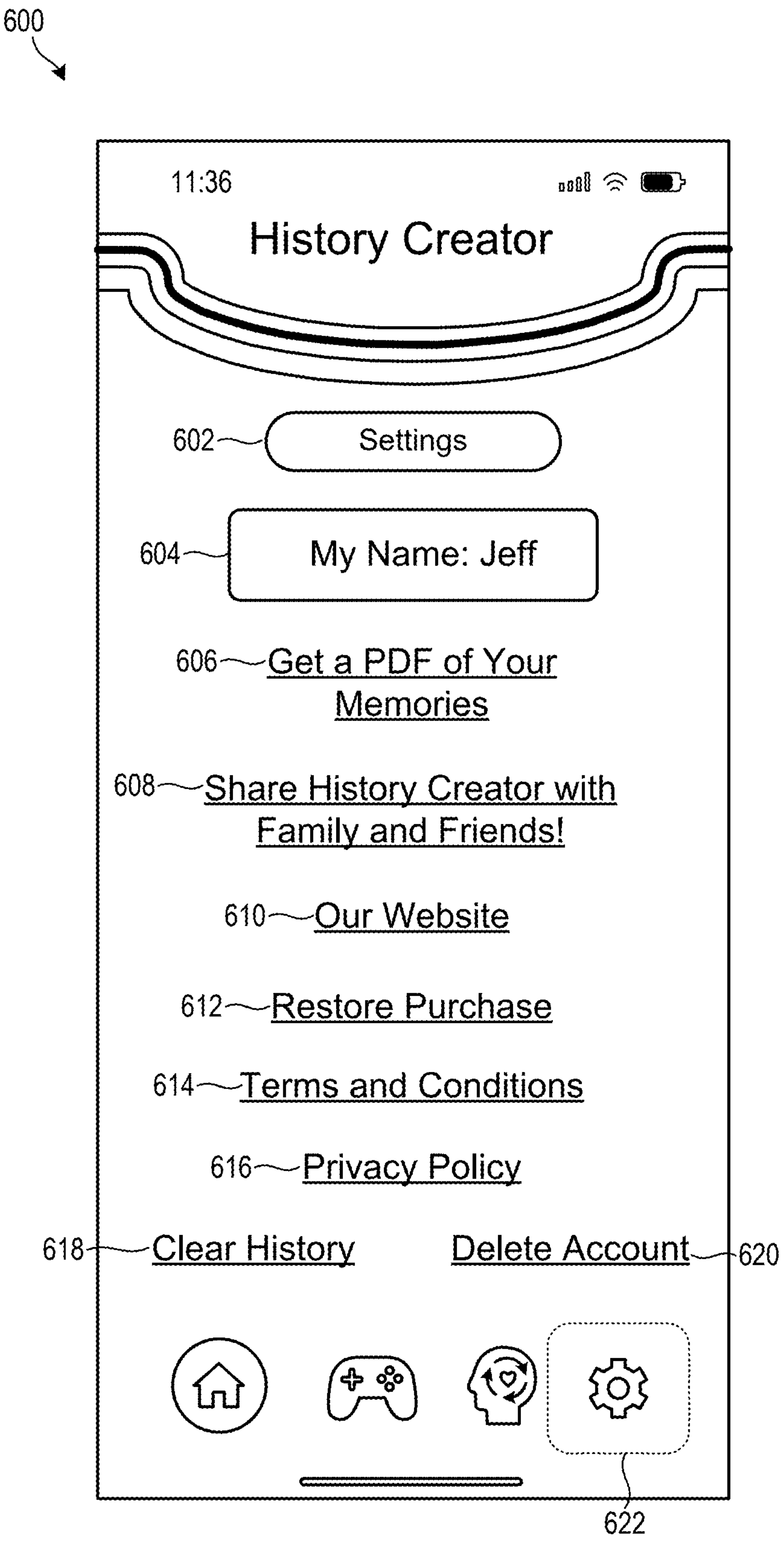
FIG. 6 shows one embodiment of a settings page of the graphical user interface for implementing the history generator module.

FIG. 6 shows one embodiment of a settings page 600 of a graphical user interface of the history generator module. In certain embodiments, the settings page 600 may be displayed by selecting a settings button 622 on the graphical user interface. This page 600 may be used to establish or modify various settings or invoke various functions for the history generator module 200. As shown, the settings page 600 includes a label 602 indicating the purpose of the page 600 and a name 604 of the account owner. The settings page 600 may also enable a user to retrieve 606 his or her memories 226 from the memory database 224 such as by printing or creating a pdf documenting the memories 226 therein. In certain embodiments, this pdf document may be emailed to the user's registered email address. The settings page 600 may also enable a user to share 608 the application (i.e., the history generator module 200) with others such as friends and family, as well as enable a user to visit a website 610 associated with the history generator module 200.

The settings page 600 may also include an option 612 to enable a user to restore a purchase in order to recover previously purchased content or services without having to pay again. The settings page 600 may also include a link 614 to terms and conditions for using the history generator module 200, as well as a link 616 to a privacy policy. Finally, in the illustrated embodiment, the settings page 600 may include an option 618 to clear the history of the history generator module 200, such as to clear any memories 226 from the memory database 224. The settings page 600 may also include an option to delete 620 a user account from the history generator module 200. These represent just a few potential features of the settings page 600 and are not intended to be limiting.

Figure 7:
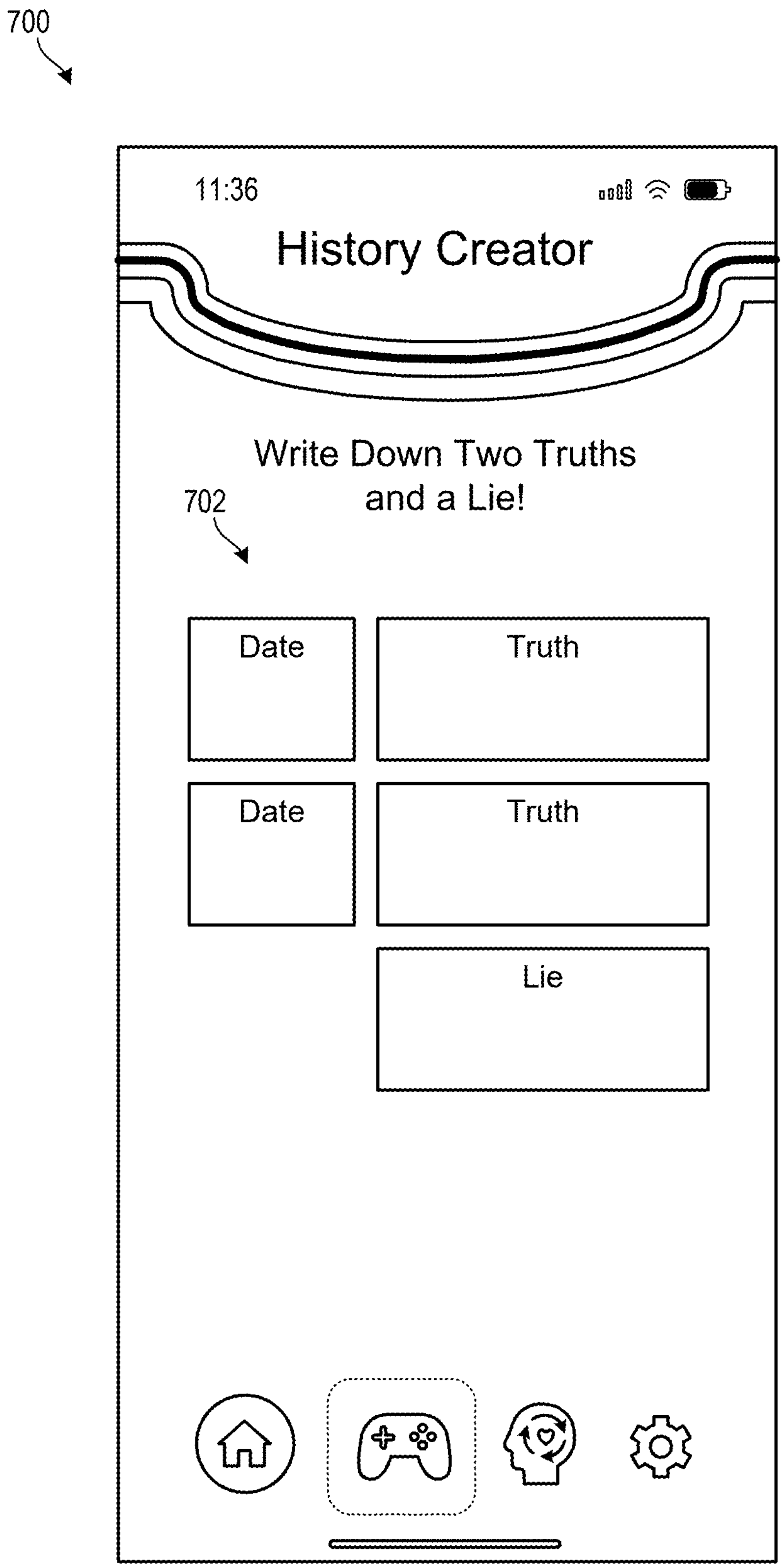
FIGS. 7-9 show one embodiment of a game that may be used to gather memories for use in creating an individual or family history.
Figure 8:
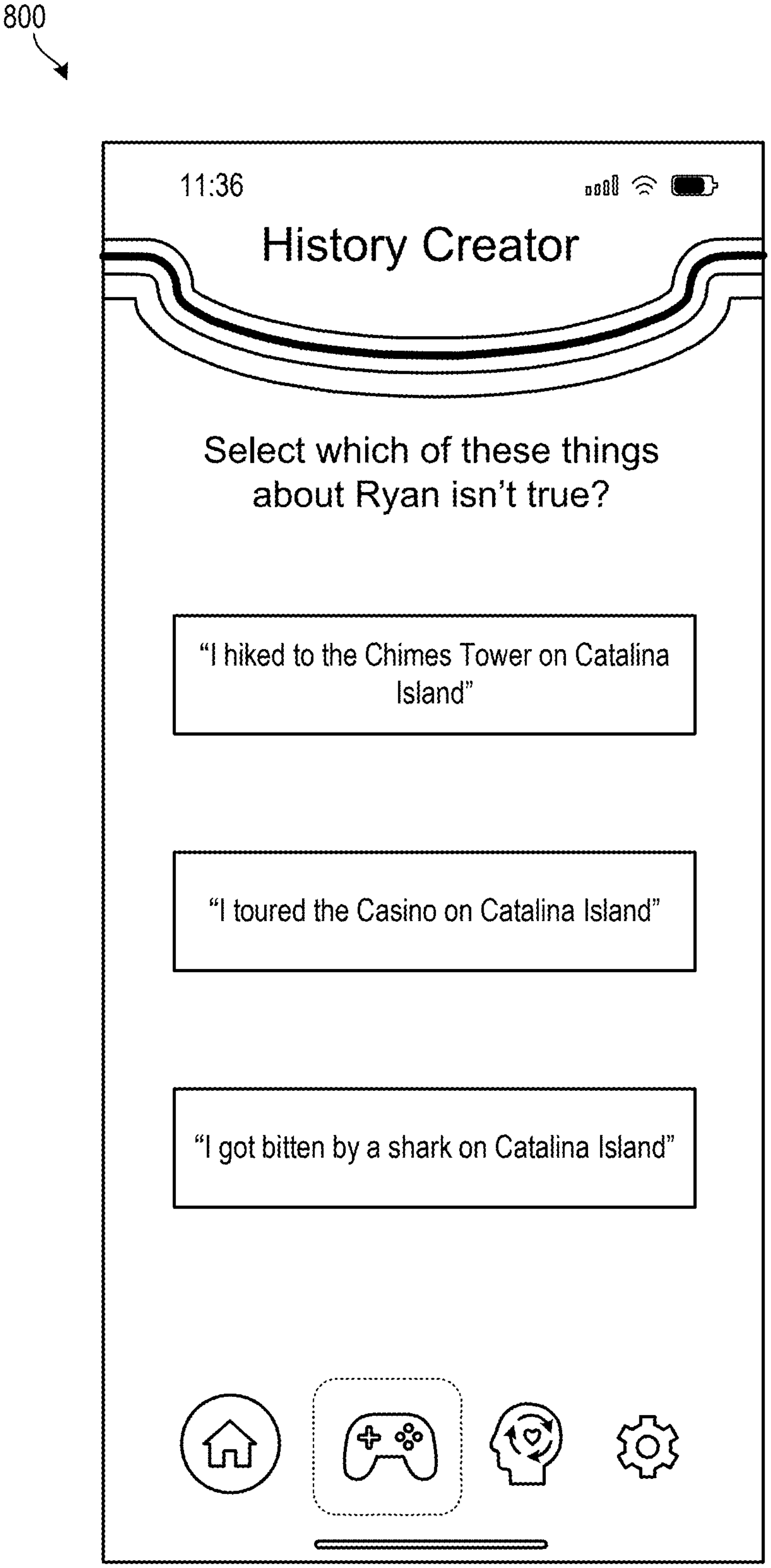
Figure 9:
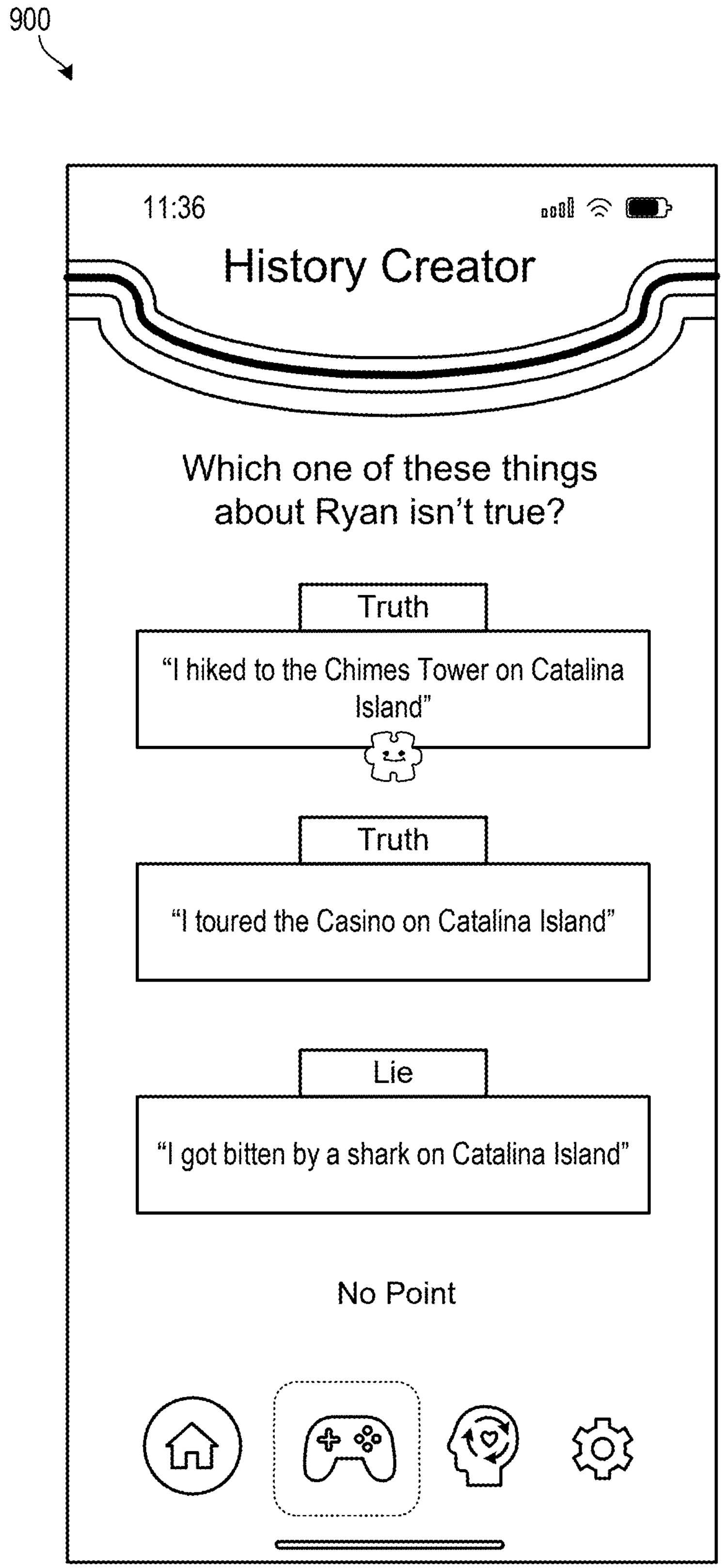

Referring to FIGS. 7-9, as previously mentioned, the game play module 204 may make the process of gathering memories 226 less tedious by gathering them in the course of playing a game. FIGS. 7-9 show one embodiment of a "two truths and a lie" game that may be used to gather memories for use in creating an individual or family history. Once a game has been started or joined, the users may be presented with a page 700 that looks like that presented in FIG. 7. As shown in FIG. 7, the user may be asked to document two truths and a lie in various form fields 702 on the page 700. The user may be asked to record dates for the two truths. Similarly, the user may be asked to record a lie. The two truths and associated dates may be recorded as memories 226 in the user's memory database 224. Once the user has entered the two truths and a lie, the user may wait until any other players in the game have done the same.

Once all users have entered two truths and a lie, the entries of a user may be presented to other users in the game such as in the manner illustrated in FIG. 8. As shown, the page 800 shows the two truths and a lie along with a question asking the user to identify which item is not true. The user may then select an item from the list that the user believes is a lie. Once all users or participants in the game have performed this step, the users may be presented with a page 900 that indicates whether the users correctly guessed the lie and identifying which items were truths and which was a lie, as shown in FIG. 9. In certain embodiments, the user may be notified whether he or she earned a point for that round as shown in FIG. 9. In this example, the user incorrectly selected a truth (i.e., the first item in the list) and thus received no point.

The pages shown in FIGS. 7-9 illustrate one type of game that can be used to gather memories 226 from a user and is not intended to be limiting. Other types of games are possible and within the scope of the invention. The more fun and intriguing the game, the more times users will ideally play the game and thus the more memories 226 that will be gathered. Over the course of time, a very significant database of memories 226 may be gathered to create an extensive individual or family history. In certain embodiments, the game play module 204 may be configured to combine memories 226 from several users' accounts, such as users belonging to the same family, to create a history for multiple people (e.g., a family or group of friends). In certain embodiments, the history generator module 200 may actually suggest users' memories 226 to combine into a single history based on the last names of the users and/or the number of times or frequency that certain users have played the game together. The artificial intelligence engine 258 previously described may organize the memories 226 and convert the memories 226 into a cohesive narrative or story.

Figure 10:
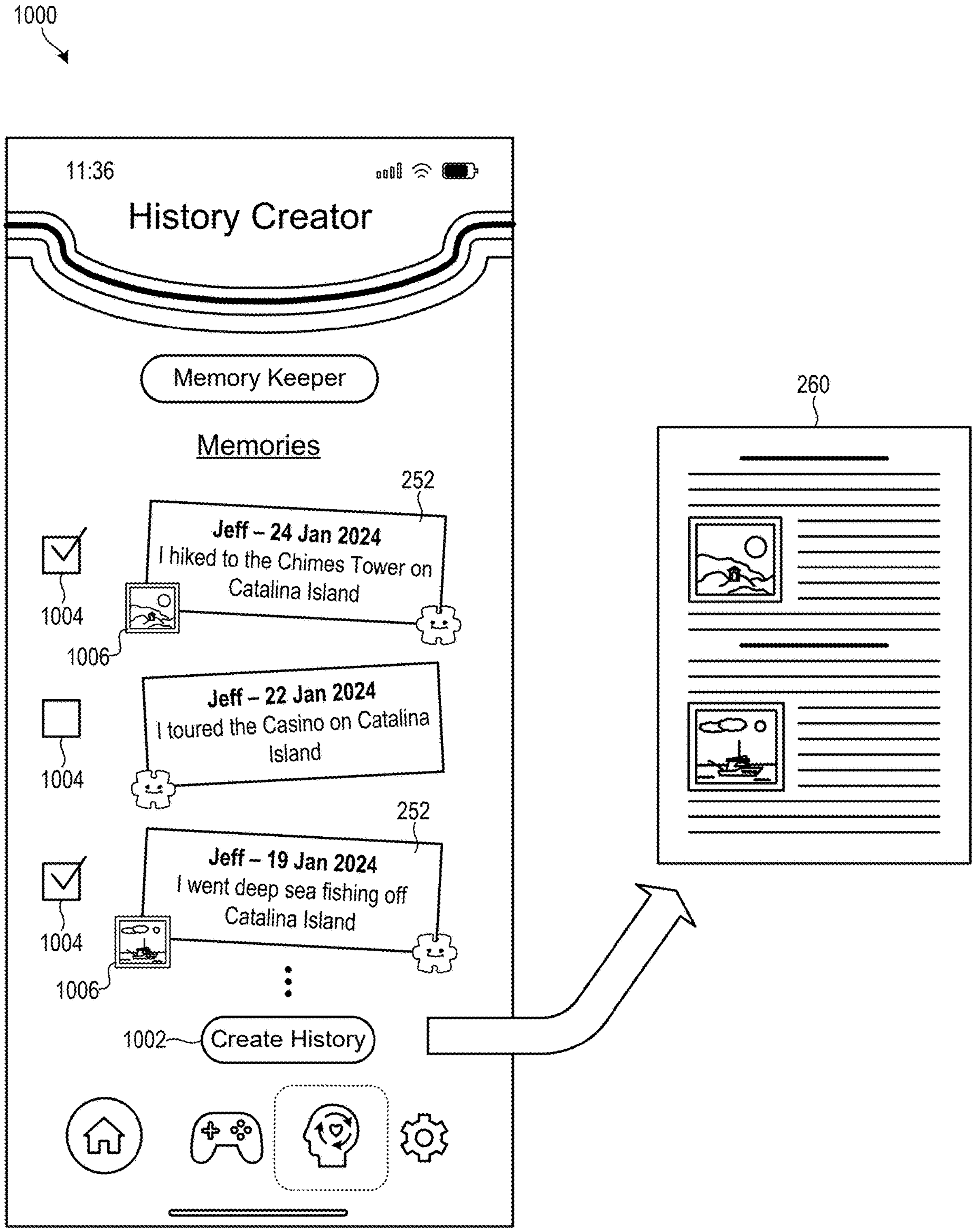
FIG. 10 shows one embodiment of a page that may be used to select memories for use in creating an individual or family history.

Referring to FIG. 10, as previously mentioned, in certain embodiments, a memory selection module 246 may enable a user to select particular memories 226 from the memory database 224 in order to perform tasks such as print the selected memories 252, create a pdf or other document containing the selected memories 252, or export the selected memories 252 to an artificial intelligence engine 258 for further processing to create an individual or family history. FIG. 10 shows an exemplary page 1000 where a check box 1004 is provided adjacent to each memory 226 to enable a user to select particular memories 226 from the memory database 224. In this example, a picture icon 1006 may be displayed with each memory 226 for which a picture is stored, as shown in FIG. 10. In certain embodiments, the list may be scrolled through to enable viewing of all of the user's memories, or a filtering mechanism may be provided to enable the memories 226 to be searched for and/or filtered by topic, date, the presence of a picture, location, or the like.

In the illustrated embodiment, a create history button 1002 is provided to enable a user to initiate creation of an individual or group (e.g., family, group of friends, etc.) history 260 in the form of a narrative 260 or story 260. In certain embodiments, the artificial intelligence engine 258 may be configured to embed pictures associated with the selected memories 252 into this narrative 260 or story 260, as shown in FIG. 10.

Referring to FIG. 11, as previously mentioned, the artificial intelligence engine 258 may, in certain embodiments, be configured to create, from the selected memories 252, a trivia game that presents various unique and/or challenging questions about a user's life based on the user's selected memories 252. In certain embodiments, these questions may be printed on physical cards as part of a physical game. Alternatively, the trivia game may be presented virtually within an application on a user's computing system as shown by the page 1100 of FIG. 11. Tapping a virtual card 1102 or performing some other action may turn the virtual card 1102 over to reveal the answer to the trivia question on the other side of the card 1102. Swiping the card 1102 or performing some other action may move to the next card 1102. These represent just a few examples are not intended to be limiting.

Figure 12:
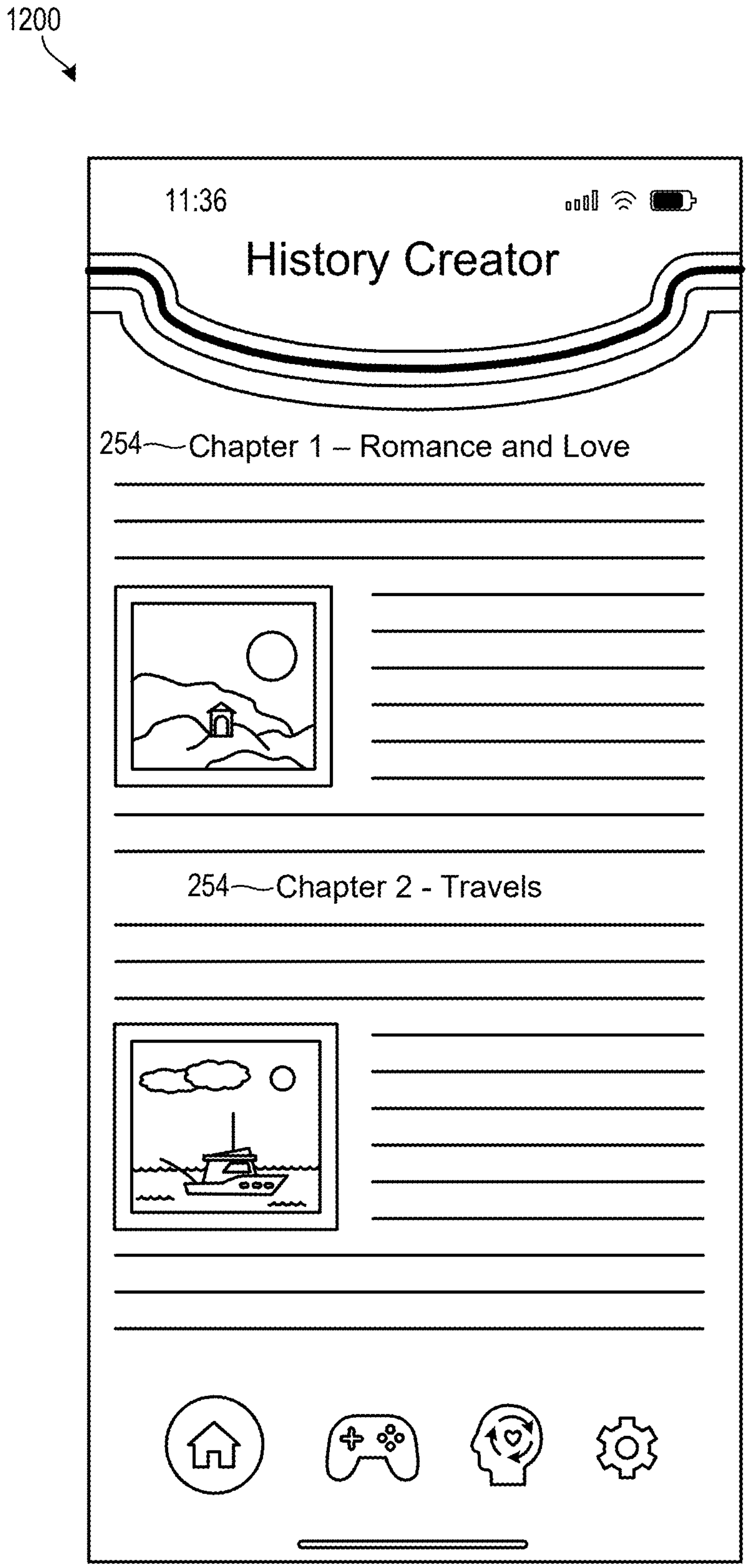
FIG. 12 shows one embodiment of an individual or family history that may be generated from memories gathered by the history generator module.

Referring to FIG. 12, as previously mentioned, in certain embodiments, an artificial intelligence engine 258 may transform selected memories 252 into an individual or group written history 260, potentially with designated chapters/topics 254 and from a designated point of view 256. In certain embodiments, the individual or group history is provided as a pdf or other document that can be viewed on the user's computing system, as shown on page 1200 of FIG. 12. In certain embodiments, this document is editable so that the user can make changes or fill in gaps in the narrative or story, or change the organization or chapter headings. In certain embodiments, once a draft is finalized, the history generator module 200 may be configured to automatically order a physical copy of the individual or family history, or create a digital document such as a pdf, for delivery to a user.

In the above disclosure, reference has been made to the accompanying drawings which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," an "example," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While various embodiments of the present disclosure have been described above, it should be understood that they have been presented by way of example only and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teachings. Further, it should be noted that any or all of the aforementioned alternate implementations may be used in any combination desired to form additional hybrid implementations of the disclosure.

The invention claimed is:

1. A method for creating an individual and/or family history, the method comprising:

collecting, by way of game play provided by a computer application, memories of a user into a memory database;

collecting, by way of the computer application, a date for each of the memories;

exporting, by the computer application, the memories in the memory database into an artificial intelligence engine capable of organizing the memories by date and transforming the memories into a written history of the user;

retrieving, by the computer application, the written history; and providing the written history to the user.

2. The method of claim 1, wherein the user is an individual.

3. The method of claim 1, wherein the user is a family.

4. The method of claim 1, further comprising enabling, by the computer application, direct entry of memories of the user into the memory database.

5. The method of claim 1, further comprising enabling, by the computer application, photos to be added to the memories in the memory database.

6. The method of claim 1, wherein exporting comprises exporting a user-designated list of memories from the memories in the memory database.

7. The method of claim 1, wherein exporting comprises exporting a user-designated list of chapters for use in creating the written history.

8. A computer program product for creating an individual and/or family history, the computer program product comprising a computer-readable storage medium having computer-usable program code embodied therein, the computer-usable program code configured to perform the following when executed by at least one processor:

collect, by way of game play provided by a computer application, memories of a user into a memory database;

collect, by way of the computer application, a date for each of the memories;

export, by the computer application, the memories in the memory database into an artificial intelligence engine capable of organizing the memories by date and transforming the memories into a written history of the user;

retrieve, by the computer application, the written history; and provide the written history to the user.

9. The computer program product of claim 8, wherein the user is an individual.

10. The computer program product of claim 8, wherein the user is a family.

11. The computer program product of claim 8, wherein the computer-usable program code is further configured to enable direct entry of memories of the user into the memory database.

12. The computer program product of claim 8, wherein the computer-usable program code is further configured to enable photos to be added to the memories in the memory database.

13. The computer program product of claim 8, wherein exporting comprises exporting a user-designated list of memories from the memories in the memory database.

14. The computer program product of claim 8, wherein exporting further comprises exporting a user-designated list of chapters for use in creating the written history.

15. A system for creating an individual and/or family history, the system comprising:

at least one processor;

at least one memory device operably coupled to the at least one processor and storing instructions for execution on the at least one processor, the instructions causing the at least one processor to:

collect, by way of game play provided by a computer application, memories of a user into a memory database;

collect, by way of the computer application, a date for each of the memories;

export, by the computer application, the memories in the memory database into an artificial intelligence engine capable of organizing the memories by date and transforming the memories into a written history of the user;

retrieve, by the computer application, the written history; and provide the written history to the user.

16. The system of claim 15, wherein the user is an individual.

17. The system of claim 15, wherein the user is a family.

18. The system of claim 15, wherein the instructions further cause the at least one processor to enable direct entry of memories of the user into the memory database.

19. The system of claim 15, wherein the instructions further cause the at least one processor to enable photos to be added to the memories in the memory database.

20. The system of claim 15, wherein exporting comprises exporting a user-designated list of memories from the memories in the memory database.

* * * * *